(12) United States Patent
Chao et al.

(10) Patent No.: US 8,097,987 B2
(45) Date of Patent: Jan. 17, 2012

(54) MOVABLE MAGNET TYPE LINEAR MOTOR WITH IMPROVED END COVER ASSEMBLY

(75) Inventors: Chih-Hsien Chao, Taichung (TW); Fu-Yuan Cheng, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 369 days.

(21) Appl. No.: 12/462,316

(22) Filed: Jul. 31, 2009

(65) Prior Publication Data

US 2011/0025136 A1 Feb. 3, 2011

(51) Int. Cl.
*H02K 41/03* (2006.01)
*H02K 5/15* (2006.01)
(52) U.S. Cl. .................. 310/12.33; 310/12.02
(58) Field of Classification Search ............... 310/12.02, 310/12.33
See application file for complete search history.

(56) References Cited

U.S. PATENT DOCUMENTS

| | | | | |
|---|---|---|---|---|
| 5,231,336 A * | 7/1993 | van Namen | .................. | 318/128 |
| 5,323,073 A * | 6/1994 | Furutani | ................... | 310/12.11 |
| 5,898,244 A * | 4/1999 | Kotsianas et al. | ............... | 310/14 |
| 6,100,609 A * | 8/2000 | Weber | ........................ | 310/12.32 |
| 6,323,567 B1 * | 11/2001 | Hazelton et al. | ........... | 310/12.29 |
| 7,378,765 B2 * | 5/2008 | Iwasa et al. | ..................... | 310/14 |

* cited by examiner

*Primary Examiner* — Burton Mullins

(57) ABSTRACT

A movable magnet type linear motor with an improved end cover assembly includes a mover having a housing and an accommodating space extending along an axis of the housing for receiving therein a coil, wherein the housing having each of two opposite ends formed with a retaining groove in a direction perpendicular to the axis of the housing for receiving an end cover that is centrally formed with a hole so as to receive a stationary inner stator, and wherein an engaging mechanism is provided between the end cover and the retaining groove so that the end cover is allowed to be assembled to the housing in the direction perpendicular to the axis of the housing and coupled with the housing.

5 Claims, 5 Drawing Sheets

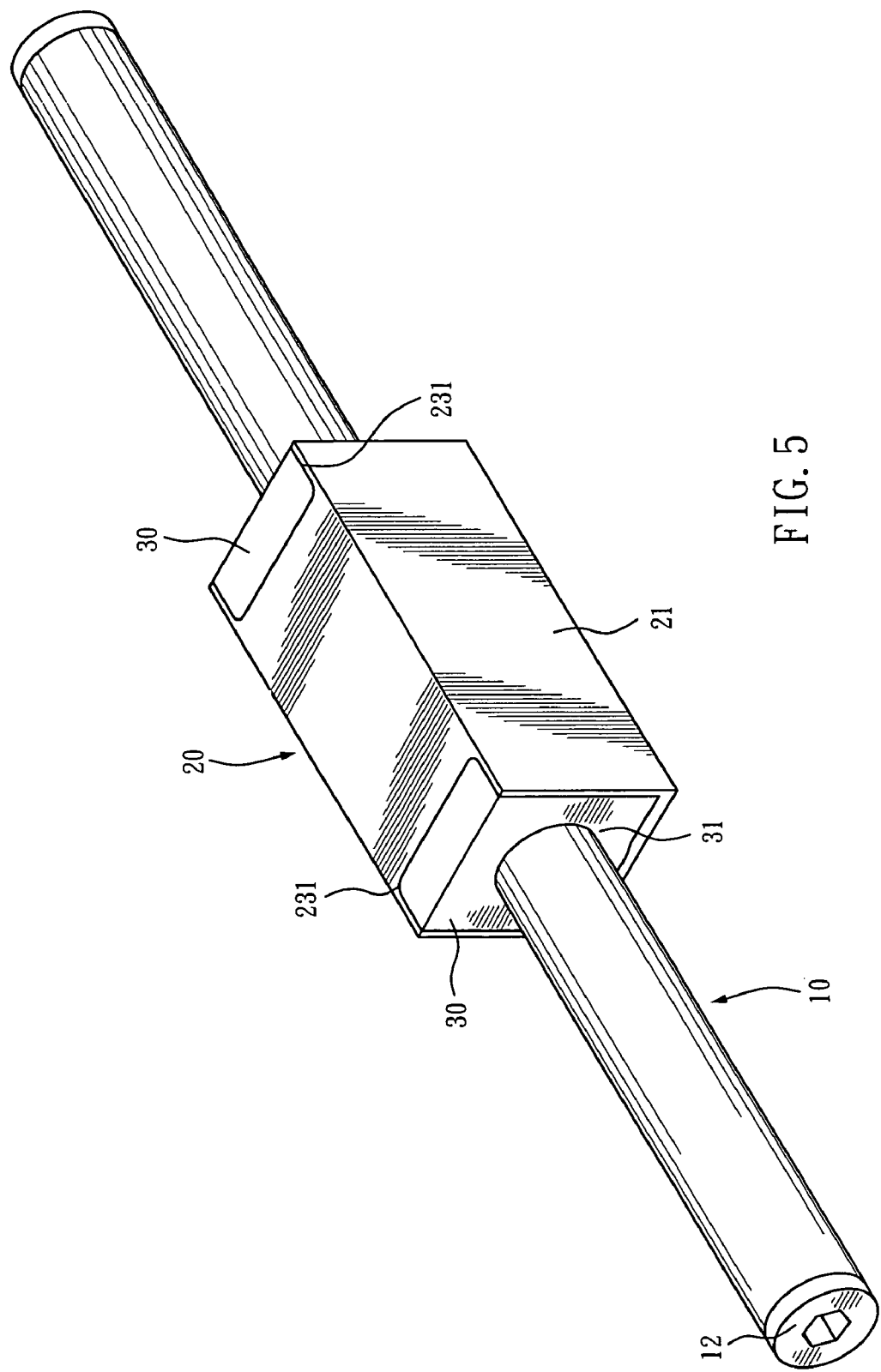

MOVABLE MAGNET TYPE LINEAR MOTOR WITH IMPROVED END COVER ASSEMBLY

BACKGROUND OF THE INVENTION

1. Technical Field

The present invention relates to movable magnet type linear motors, and more particularly, to a movable magnet type linear motor with an improved end cover assembly.

2. Description of Related Art

FIGS. 1 and 2 illustrate a known movable magnet type linear motor, which comprises a stationary inner stator 1 that is structurally a hollow tube filled with a plurality of permanent magnets, a mover 2 that is constructed form a housing 3 accommodating therein a mover coil 4, wherein two end covers 6 are provided to seal two openings 5 at opposite ends of the housing 3 and each said end cover 6 is centrally formed with a hole 7 so that the stationary inner stator 1 is allowed to axially pass through and get slidably received in the mover 2. When a current flows through the mover coil 4, the mover coil 4 produces a magnetic field to interact with the permanent magnets inside the stationary inner stator 1 thereby driving the mover 2 to axially shift along the stationary inner stator 1. The known movable magnet type linear motor is advantageous because the stationary inner stator 1 and the mover 2 are associated with magnetic levitation means and no contact friction happens therebetween. As a result, component frictional loss is minimized and the movable magnet type linear motor performs swift running and stable braking.

However, the known movable magnet type linear motor has its defects.

That is, the end covers 6 of the mover 2 are typically fastened to the housing 3 by plural screws. In practice, since assembling each said end cover 6 requests at least 2 to 4 screws, it is labor-consuming in manual assembling operation and cost-consuming in automated assembling operation, both cases being uneconomical. Besides, operation of the known liner motor totally relies on the magnetic force of the permanent magnet and the mover coil 4, and thus the housing 3 and end covers 6 have to be made of non-magnetic material, which is mainly aluminum, for preventing magnetic interference. However, aluminum is relatively soft and tends to deform after repeated assembly and disassembly of the end covers 6 thereto. On the other hand, the cover ends 6 bear continuous axial impact caused by the magnetic force of the mover coil 4. Unfortunately, the direction where the screws are screwed to the housing 3 is parallel to this axial impact and the combination is challenged by the magnetic force of the mover coil 4. Consequently, the end covers 6 are likely to loose or come off after long-term use.

SUMMARY OF THE INVENTION

In view of the defects of the prior art, one objective of the present invention is to provide a movable magnet type linear motor with an improved end cover assembly, wherein the end cover assembly involves fewer fabrication elements as compared with the known device and requires no tool in assembly.

Another objective of the present invention is to provide a movable magnet type linear motor with an improved end cover assembly for a movable magnet type linear motor, wherein the end cover assembly is able to endure an axial force of a mover coil during acceleration or stop, so as to prevent combination between end covers and a housing from loosing even after long-term use.

To achieve these and other objectives, the movable magnet type linear motor comprises a mover having a housing and an accommodating space extending along an axis of the housing for receiving therein a coil, wherein the housing having each of two opposite ends formed with a retaining groove in a direction perpendicular to the axis of the housing for receiving an end cover that is centrally formed with a hole so as to receive a stationary inner stator, and wherein an engaging mechanism is provided between the end cover and the retaining groove so that the end cover is allowed to be assembled to the housing in the direction perpendicular to the axis of the housing and coupled with the housing.

BRIEF DESCRIPTION OF THE DRAWINGS

The invention as well as a preferred mode of use, further objectives and advantages thereof will be best understood by reference to the following detailed description of an illustrative embodiment when read in conjunction with the accompanying drawing, wherein:

FIG. 5 is an assembled view of the movable magnet type linear motor of FIG. 4.

DETAILED DESCRIPTION OF THE PREFERRED EMBODIMENT

While a preferred embodiment provided hereinafter for illustrating the concept of the present invention as described above, it is to be understood that the components of the embodiment shown in the accompanying drawings are depicted for the sake of easy explanation and need not to be made in scale.

Figure 1:
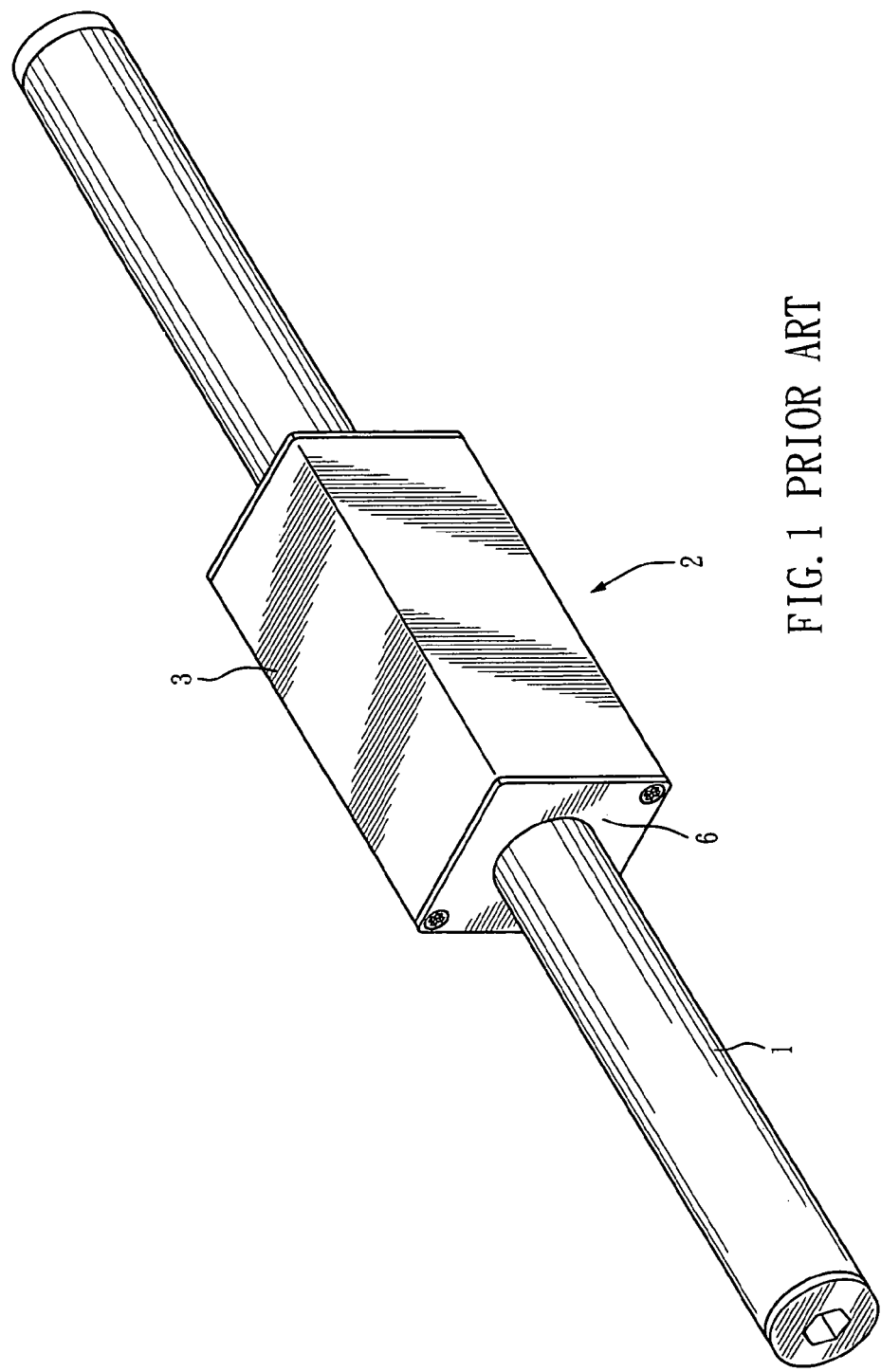
FIG. 1 is a perspective view of a conventional movable magnet type linear motor.
Figure 2:
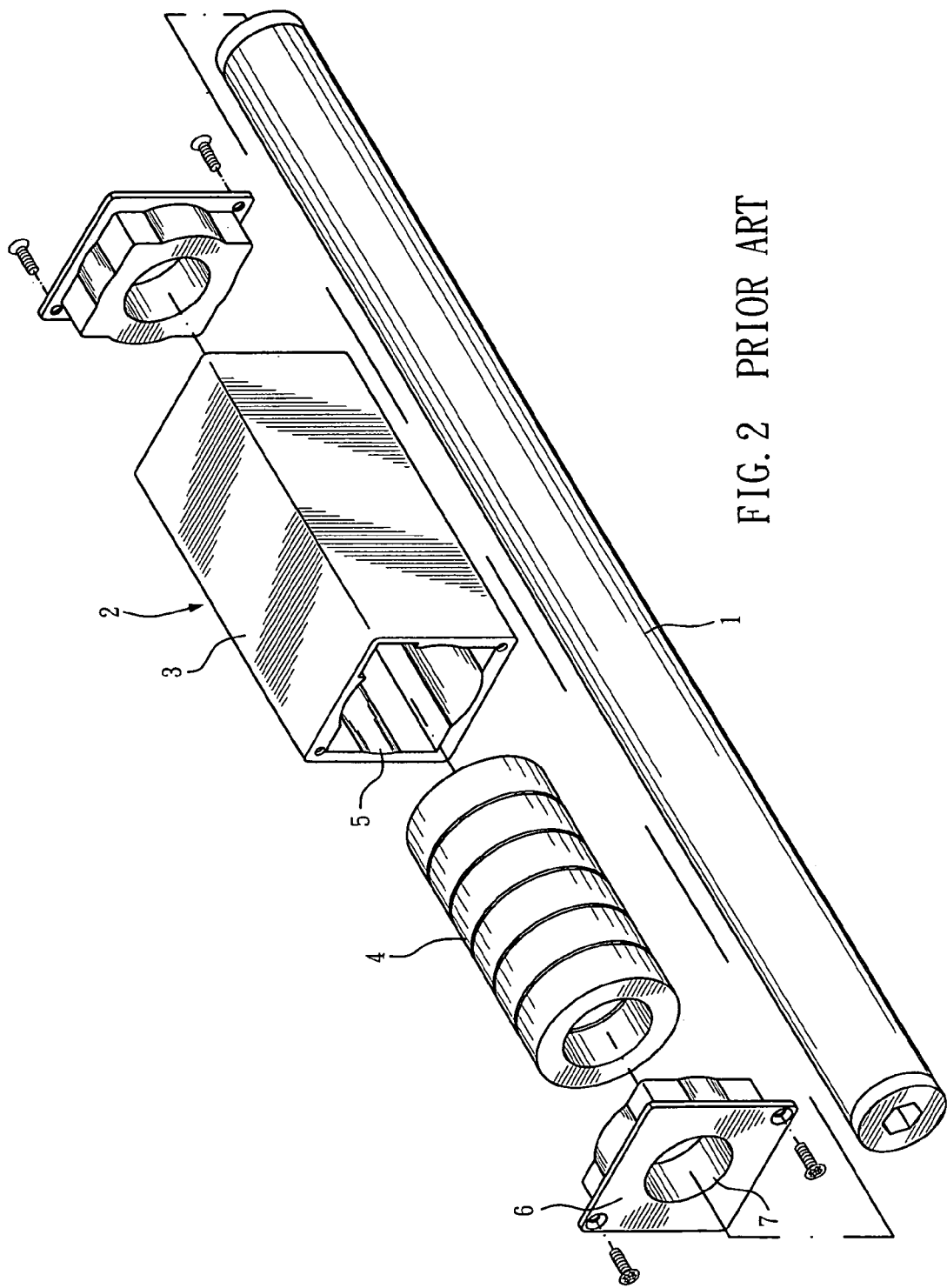
FIG. 2 is an exploded view of the conventional movable magnet type linear motor.
Figure 3:
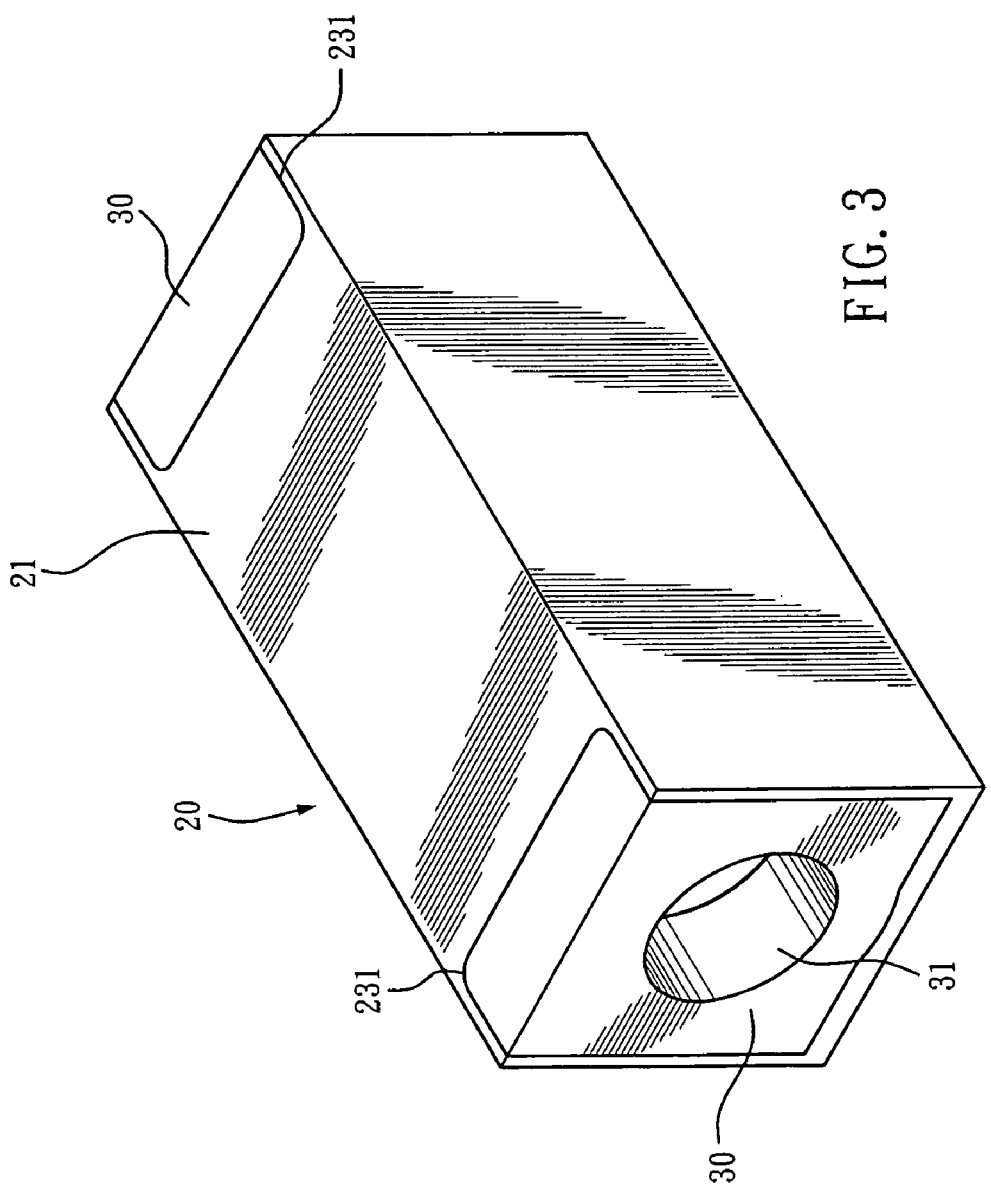
FIG. 3 is a perspective view of a mover according to the present invention.
Figure 4:
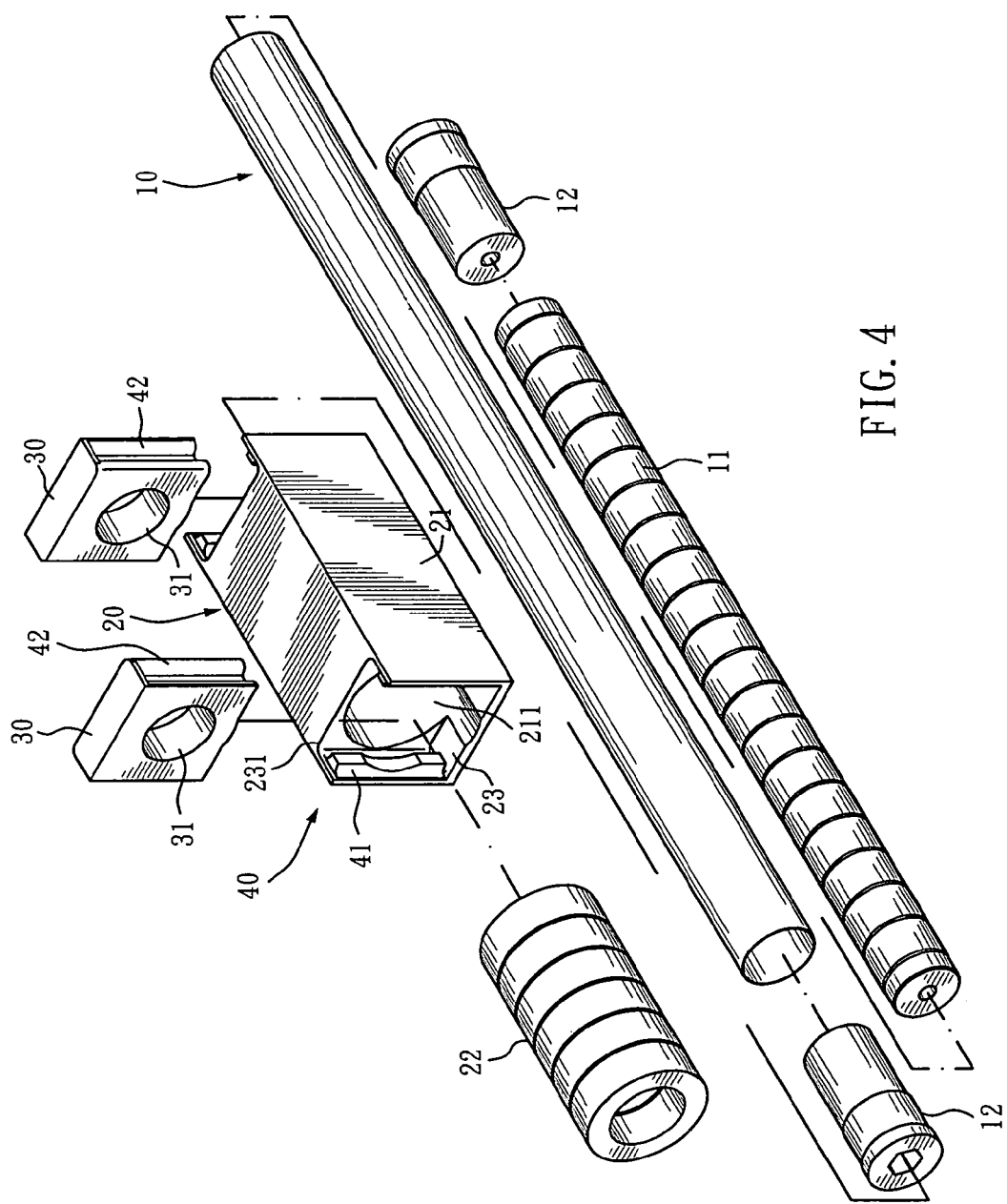
FIG. 4 is an exploded view of a movable magnet type linear motor according to the present invention.

Please refer to FIGS. 3 through 5 for an end cover assembly for a movable magnet type linear motor, which includes a stationary inner stator 10, a mover 20, two end covers 30, and an engaging mechanism 40.

Therein, the stationary inner stator 10 includes a hollow tube filled with a plurality of permanent magnets 11. Two plugs 12 are attached to two opposite ends of the inner stator 10 so as to retain the permanent magnets 11 in the hollow tube.

The mover 20 is constructed form a hollow housing 21 that is axially formed with an accommodating space 211 passing therehrough. Two retaining grooves 23 are formed at two opposite ends of the housing 21. The retaining grooves 23 are extended perpendicular to an axis of the housing 21 and each said retaining groove 23 has an opening 231 located at one side of the housing 21.

Each of the two end covers 30 formed with a hole 31. The holes 31 allow the inner stator to pass therethrough so that the mover 20 is slidably mounted around the inner stator 10.

The engaging mechanism 40 is provided between contacting surfaces of the retaining groove 23 and the end cover 30 in the form of matching tenon 41 and mortise 42. The tenon 41 and mortise 42 are also extended perpendicular to the axis of the housing 21 so that the end cover 30 may slide into the groove 23 through the opening 231 and get engaged. More particularly, the engaging mechanism 40 may be such configured that two tenons 41 are formed on an inner wall of the housing 21 near the grooves 23, respectively, while each said end cover 30 is correspondingly provided with a recessed mortise 42.

Referring to FIG. 5, the end cover assembly of the present invention involves fewer fabrication elements as compared with the prior art and thus allows easy assembly by pushing the end cover 30 inward the groove 23 through the opening 231. The end cover 30 can automatically engaged with and thus retained in the groove 23 at either end of the housing 21 without assistance of any screw element or tool. The end covers 30 of the mover 20 can be easily combined with the housing 21, thereby significantly saving assembling time.

Furthermore, when the end covers 30 and the housing 21 are combined on the strength of the engaging mechanism 40, the grooves 23, tenons 41, and mortises 42 all extend perpendicular to the axis of the housing 21, so as to effectively resist the axial impact from the coil 22 during acceleration and stop. Therefore, the end covers 30 and the housing 21 are firmly secured from loosing even after long-term use.

The present invention has been described with reference to the preferred embodiment and it is understood that the embodiment is not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A movable magnet type linear motor with an improved end cover assembly, the movable magnet type linear motor comprising:

a mover having:
    a housing having two opposite ends each formed with a retaining groove in a direction perpendicular to an axis of the housing; and
    an accommodating space extending inside the housing along the axis of the housing;
    a coil received in the accommodating space;
    two end covers each received in a respective said retaining groove and having a central hole; and
    an engaging mechanism provided between each pair of the coupled end cover and retaining groove, and
a stationary inner stator passing through the central holes of the end covers;
whereby the end covers are assembled to and coupled with the housing in the direction perpendicular to the axis of the housing.

2. The movable magnet type linear motor of claim 1, wherein each said groove has an opening located at one side of the housing.

3. The movable magnet type linear motor of claim 1, wherein the engaging mechanism is configured as matching tenons and mortises between contacting surfaces of the retaining grooves and the end covers.

4. The movable magnet type linear motor of claim 3, wherein the tenons and the mortises extend perpendicular to an axis of the housing.

5. The movable magnet type linear motor of claim 3, wherein the two tenons are formed on an inner wall of the housing near the grooves, respectively, and the end covers are correspondingly provided with recessed mortises.

* * * * *